Oct. 11, 1927.

F. SWICKARD 1,644,962

MOWER CUTTING APPARATUS

Filed Jan. 15, 1925 2 Sheets-Sheet 1

Inventor.
Frank Swickard.

By Walter W. Burns
Attorney

Patented Oct. 11, 1927.

1,644,962

UNITED STATES PATENT OFFICE.

FRANK SWICKARD, OF CLARINDA, IOWA, ASSIGNOR OF ONE-HALF TO WILBUR A. BLAKELY, OF GRANT CENTER, IOWA.

MOWER CUTTING APPARATUS.

Application filed January 15, 1925. Serial No. 2,465.

This invention relates to the cutting mechanism of mowing machines and the like and has particular relation to means for reciprocating two sickles in opposite directions.

The primary object of my invention is the provision of an improved operating mechanism for double sickles in cutting apparatus for mowing machines and the like.

Another object of my invention is the provision of an operating mechanism for mowing machine cutting mechanism which is adapted for application in converting the ordinary single sickle cutting mechanism into a double cutter without change in the inner or outer shoes of the sickle bar.

A further object of my invention is the provision of an operating mechanism for mowing machine cutting mechanism which is capable of application to double cutter sickles at any place throughout the length of the cutters.

Another and still further object of my invention is the provision of a mechanism for operating a double sickle cutting mechanism having a connection to the upper sickle on its top and the lower sickle on its bottom.

Another and still further object of my invention is the provision of an operating mechanism for double sickle mowing machine cutting mechanism which has all of its operating parts to the rear of the cutting edges of the sickle blades.

Other and further objects will be apparent, to those skilled in the art, from a reading of the complete specification.

Referring to the drawing wherein I have illustrated a preferred embodiment of my invention, Figs. 1 and 2 illustrate my invention, the cutters being in different positions in the different views.

Similar reference characters refer to the same or similar parts throughout the several figures of the drawing.

Figure 1:
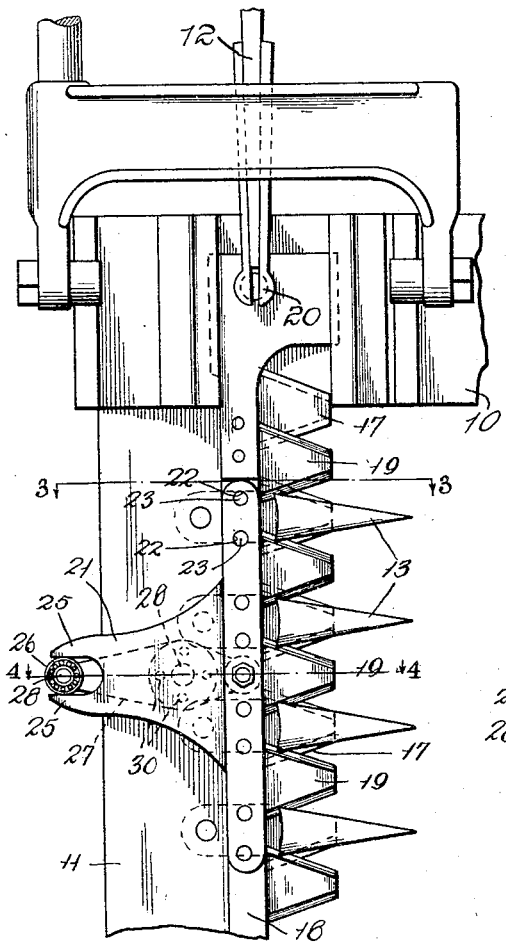

In the drawing, 10 designates the inner shoe of the cutting mechanism, 11 the sickle bar and 12 the pitman which is reciprocated in the ordinary well known or any suitable way.

My invention while well adapted to be attached to most of the cutting mechanisms now on the market, in converting the cutting mechanism from the single cutter type to the double cutter type, is well adapted for use on new cutting mechanism. In making the change in the case of the old cutting mechanism attention is called to the fact that no substantial parts have to be scrapped. In making the installation in the case of the new machines, no substantial changes from the old structures are necessary except the addition of the new attachment and the additional cutting mechanism in the case of converting the single cutter type into the double cutter type.

Figure 2:
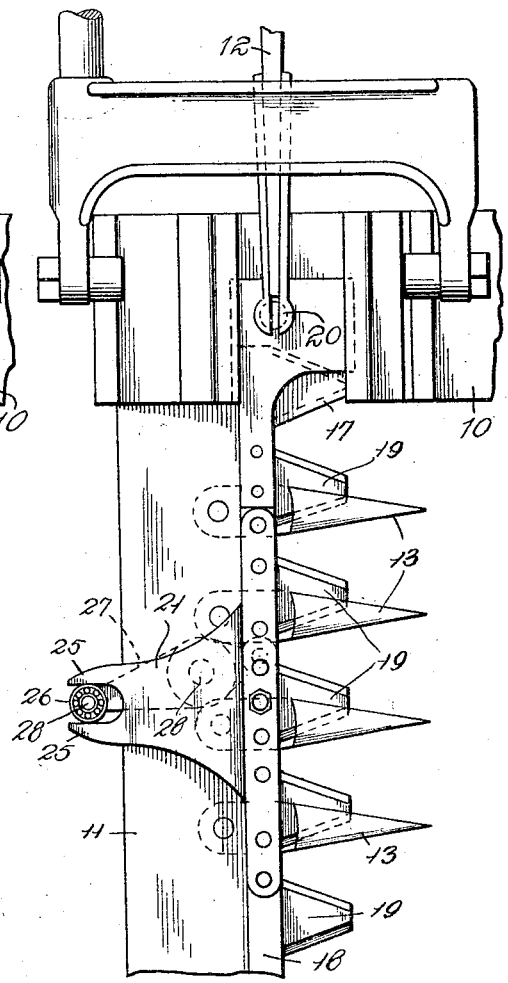
Figure 3:
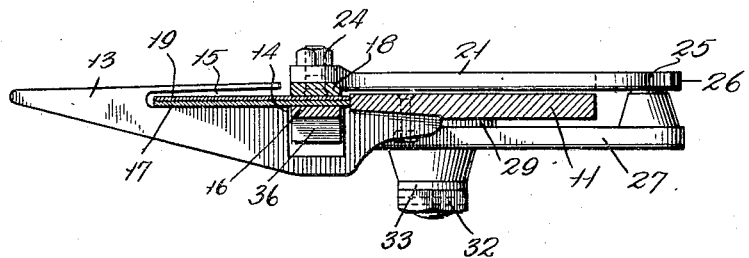
Fig. 3 is a cross section on the line 3—3 of Fig. 1.
Figure 4:
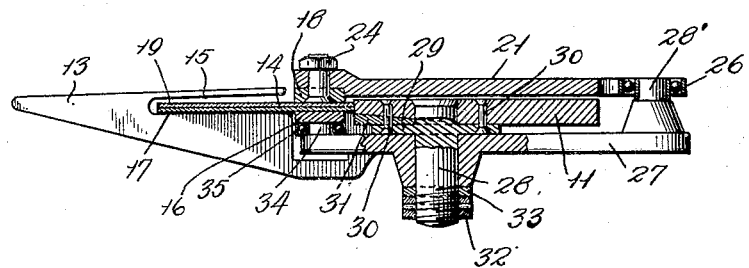
Fig. 4 is a cross section on the line 4—4 of Fig. 1.
Figure 5:
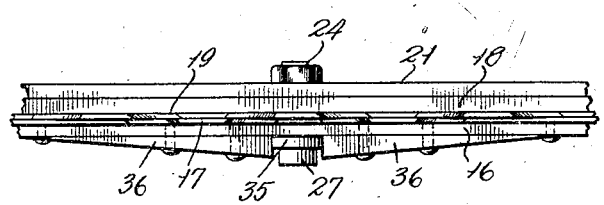
Fig. 5 is a fragmental longitudinal view illustrating the lower sickle bar with the lugs attached.
Figure 6:
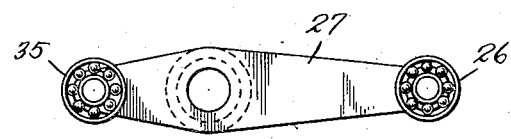
Fig. 6 is a detail view of the rocker arm.

The guard fingers 13, shown in Figures 1, 2, 3 and 4, are provided with cut away portions which, with the forward side of the sickle bar 11, form a series of aligned recesses 14 for the support of the sickle. In the ordinary structure, the ledger plates or stationary cutters rest on the lower side of the cut away portions 15 of the guard fingers 13. The sickle strap rests upon the bottom of the aligned recesses 14 and the ledger plate. In converting to the two cutter type with my invention, the guard fingers are grooved at the bottom of the recesses 14, a depth equal to the thickness of the ledger plates which are removed in the conversion operations.

In the drawing a lower sickle composed of the sickle bar strap 16 and the sickle knives 17, attached thereto, occupy the recesses 14 and the cut away portions 15. In contact with the lower sickle is the upper sickle composed of the sickle bar strap 18 and the upper sickle knives 19. The knives 17 and 19 have their cutting edges in contact with each other to produce a shearing action. The pitman 12 is connected at its outer end to the inner end of the upper sickle bar strap 18 by a ball and socket connection 20 which transmits the reciprocating motion of the outer end of the pitman to the sickle bar.

At some convenient place on the upper sickle bar strap, is attached a drive yoke 21 which is provided with holes 22 to receive heads 23 of rivets which secure the sickle knives 19 to the sickle knife straps 18. The drive yoke 21 is provided with a bolt hole adjacent its center line and in a line with the openings 22. This bolt hole is opposite a bolt secured in the sickle bar strap 18 which bolt, with the nut 24, secures the yoke in place.

At the rear end of the yoke 21 is a pair of jaws 25 between which is a bearing connection 26 with the rocker arm 27. This bearing connection 26 is here illustrated as a ball bearing, the inner ring engaging a cylindrical bearing surface 28' on the rocker arm 27. The outer ring has a rolling action with the inside adjacent surfaces of the jaws 25.

The rocker arm 27 is fulcrumed on a rocker arm stud 28 which is suitably mounted in an opening in the sickle bar 11. A flange 29 is provided with holes which register with corresponding holes in the sickle bar 11. Rivets 30 are placed in these holes and serve to hold the parts in rigid relation. A shim 31 is provided to support the flange 29 in parallel relation to the upper surface of the sickle bar 11.

The rocker arm 27 is held on its bearing on the rocker arm stud 28 by means of the nut 32 and the case hardened washer 33.

At the forward end of the rocker arm 27 is a cylindrical bearing portion 34 on the outside of which is the bearing connection 35. This latter comprises an inner ring in contact with the cylindrical bearing portion 34, an outer ring and a set of balls therebetween. The cylindrical bearing portion is preferably placed directly below the lower sickle and in position to engage lugs 36 which have opposed parallel surfaces and of a distance apart equal to the outer diameter of the outer ring of the bearing connection 35.

The distance from the axis of the stud 28 to the axis of the cylindrical bearing surface 28' is preferably, although not necessarily, twice the distance from the axis of the stud 28 to the axis of the cylindrical portion 34.

My improved means for operating the cutting mechanism of a double cutter for mowing machines is adapted for use with the present double cutters now on the market as well as for the conversion of the single cutter to the double cutter, as already pointed out.

The operation of my invention is as follows:—The pitman 12 reciprocates at its outer end in a well known manner. This reciprocating motion is transmitted to the upper sickle strap 18 to which is connected the drive yoke 21. Motion is transmitted from the jaws 25 of the yoke 21 to the rocker arm 27 by way of the bearing connection 26. A movement of the yoke in an outward direction causes an outward movement of the rear end of the rocker arm with a consequent inward movement of the forward end. As the forward end of the rocker arm is operatively connected to the lower sickle bar strap 16 by means of the lugs 36 and the bearing connection 34, it will be clear that as the upper sickle moves outwardly the lower sickle will be moved inwardly and when the upper sickle moves inwardly, the lower sickle will move outwardly, thus bringing about a cutting action between two movable blades and throughout the length of the sickle. It is to be noted that in the embodiment herein illustrated and described, the travel of the upper sickle will be about twice that of the travel of the lower blade. This construction has been found, in practice, to be advantageous due to frictional losses in transmission and to have the necessary power for cutting delivered during a longer stroke, thus reducing, to a minimum, the thrust in the pitman.

While I have described in detail an embodiment of my invention, I desire to have it understood that I do not limit myself to the exact showing, and that modifications and changes may be made without departing from the spirit of my invention and within the scope of the appended claims.

Having described my invention, what I claim is:—

1. A mowing machine cutting mechanism comprising a sickle bar, two cooperating sickles, an oscillating member pivoted to the sickle bar and extending therebeneath, and means operatively connecting the opposite ends of the oscillating member to the respective sickles.

2. A mowing machine cutting mechanism comprising a pitman, a sickle bar, two cooperating sickles, means connected to the sickles and to the rear of the cutting edges and between the cutting ends of the sickles, for simultaneously reciprocating the sickles in directions opposite to each other and a single direct pivotal connection between the pitman and one of the sickles.

3. A mowing machine cutting mechanism comprising a sickle bar, two cooperating sickles, a yoke connected rigidly to one of the sickles between the ends of the cutting length and extending to the rear thereof, an oscillating member pivoted intermediate its ends to the bottom of the sickle bar and having one end operatively connected to the yoke and the other end operatively connected to the other sickle.

4. A mowing machine cutting mechanism comprising a sickle bar, two superimposed cooperating sickles, a yoke connected rigidly to the top sickle and extending to the rear thereof, an oscillating member pivoted intermediate its ends beneath and to the sickle bar, the yoke being provided with jaws in operative engagement with the oscillating member, at one end, the opposite end of the oscillating member being operatively connected to the bottom sickle.

5. A mowing machine cutting mechanism comprising a sickle bar, two cooperating sickles, a pitman connected directly to one of the sickles to drive the same, means connected to the sickles and to the rear of the cutting edges and between the cutting ends of the sickles for simultaneously reciprocating the sickles in directions opposite to each other.

6. A mowing machine cutting mechanism comprising a sickle bar, two cooperating sickles, means connected to one of the sickles to drive the same, means operatively connecting the sickles together, for simultaneous reciprocation of the sickles in opposite directions, said means being to the rear of the sickle cutting edges and comprising a rocker arm pivoted to the underside of the sickle bar.

7. A mowing machine cutting mechanism comprising a sickle bar, a shoe at the inner end of the sickle bar, two cooperating sickles and means connected to the sickles to cause operation of one from the other, said means being between the outer cutting ends of the sickles.

8. A mowing machine cutting mechanism comprising a sickle bar, a shoe at the inner end of the sickle bar, two cooperating sickles and means connected to the sickles to cause operation of one from the other, said means being between the outer cutting ends of the sickles and located to the rear of the cutting edges of the sickles.

9. A mowing machine cutting mechanism comprising a sickle bar, two cooperating sickles, a pintle secured to the underside of the sickle bar and intermediate its ends, a rocker arm pivoted on the pintle, upright bearings on the rocker arm, a yoke on one of the sickles and connected to one end of the rocker arm and movable therewith and lugs on the other sickle bar and in the path of movement of the other end of the rocker arm to be moved thereby.

10. A mowing machine cutting mechanism comprising a sickle bar, two cooperating sickles, a pintle secured to the underside of the sickle bar, a rocker arm pivoted on the pintle, upright bearings on the rocker arm, members connected with the upper and lower sickles and each having oppositely disposed pairs of parallel surfaces extending in directions perpendicular to the length of the sickles, inner bearing members mounted on the upright bearings of the rocker arms, outer ring bearing members having rolling action with their respective oppositely disposed surfaces and rolling bearing means between the outer and inner bearing members.

In testimony whereof I hereunto affix my signature.

FRANK SWICKARD.